(12) United States Patent
Hillard et al.

(10) Patent No.: US 10,412,111 B2
(45) Date of Patent: Sep. 10, 2019

(54) SYSTEM AND METHOD FOR DETERMINING NETWORK SECURITY THREATS

(71) Applicants: Dustin Lundring Rigg Hillard, Seattle, WA (US); Art Munson, Seattle, WA (US); Lawrence Cayton, Seattle, WA (US); Scott Golder, Seattle, WA (US)

(72) Inventors: Dustin Lundring Rigg Hillard, Seattle, WA (US); Art Munson, Seattle, WA (US); Lawrence Cayton, Seattle, WA (US); Scott Golder, Seattle, WA (US)

(73) Assignee: eSentire, Inc., Cambridge, Ontario ( * ) Notice: Subject to any disclaimer, the term of this patent is extended or adjusted under 35 U.S.C. 154(b) by 0 days.

(21) Appl. No.: 15/396,273

(22) Filed: Dec. 30, 2016

(65) Prior Publication Data

US 2018/0191763 A1    Jul. 5, 2018

(51) Int. Cl.
*H04L 29/06* (2006.01)
*G06N 20/00* (2019.01)
*G06F 21/55* (2013.01)

(52) U.S. Cl.
CPC .......... *H04L 63/1433* (2013.01); *G06F 21/55* (2013.01); *G06F 21/552* (2013.01); *G06F 21/554* (2013.01); *G06N 20/00* (2019.01); *H04L 63/1408* (2013.01); *H04L 63/1416* (2013.01); *H04L 63/1425* (2013.01)

(58) Field of Classification Search
CPC ............. H04L 63/1433; H04L 63/1425; H04L 63/1416; G06N 99/005; G06N 20/00; G06F 21/552; G06F 21/55; G06F 21/554
See application file for complete search history.

(56) References Cited

U.S. PATENT DOCUMENTS

| 9,479,518 | B1 | 10/2016 | Fang et al. | |
|---|---|---|---|---|
| 9,516,053 | B1 * | 12/2016 | Muddu | ............... H04L 63/1425 |
| 2014/0101259 | A1 * | 4/2014 | Barone | .................. G06Q 50/10 |
| | | | | 709/206 |
| 2015/0106927 | A1 | 4/2015 | Ferragut et al. | |
| 2015/0213246 | A1 * | 7/2015 | Turgeman | ............... G06F 21/32 |
| | | | | 726/23 |

(Continued)

OTHER PUBLICATIONS

International Search Report and Written Opinion for PCT/US2017/069126, dated Apr. 26, 2018.

*Primary Examiner* — Robert B Leung
*Assistant Examiner* — Thomas Ho
(74) *Attorney, Agent, or Firm* — Fish & Richardson P.C.

(57) ABSTRACT

System and methods for determining network threats are disclosed. For each entity operating in a network being monitored for network security, an example method obtains an observed metric value for each metric that characterizes actions performed by the entity. Each observed metric value may be input into a machine learning model that is specific to the metric in order to determine an anomaly score for the observed metric value that represents how anomalous the observed metric value is relative to an expected metric value for the metric. A threat score may then be determined for each entity from the anomaly scores for each metric. A security threat presentation that identifies one or more high-scoring entities according to the threat scores may be generated and provided for display on a user device.

21 Claims, 6 Drawing Sheets

(56) References Cited

U.S. PATENT DOCUMENTS

| | | | |
|---|---|---|---|
| 2015/0264061 A1* | 9/2015 | Ibatullin | H04L 63/145 |
| | | | 726/23 |
| 2015/0373039 A1* | 12/2015 | Wang | H04L 63/1425 |
| | | | 726/23 |
| 2015/0381646 A1 | 12/2015 | Lin | |
| 2016/0065594 A1* | 3/2016 | Srivastava | H04L 63/1433 |
| | | | 726/23 |
| 2016/0092684 A1* | 3/2016 | Langton | G06F 21/567 |
| | | | 726/23 |
| 2016/0171415 A1* | 6/2016 | Yampolskiy | H04L 63/1433 |
| | | | 705/7.28 |
| 2016/0226905 A1 | 8/2016 | Baikalov et al. | |
| 2016/0234167 A1* | 8/2016 | Engel | H04L 63/1408 |
| 2017/0118240 A1* | 4/2017 | Devi Reddy | G06N 7/005 |
| 2017/0142147 A1* | 5/2017 | Singla | H04L 63/1433 |
| 2019/0089711 A1* | 3/2019 | Faulkner | H04L 63/102 |

\* cited by examiner

| Risk Score (501) | Time Range (502) | Stage 3 Risk (503A) | Stage 4 Risk (503B) | Stage 5 Risk (503C) | Case Story (504) | Details (505) |
|---|---|---|---|---|---|---|
| 0.97 | 12/11/15 - 1/27/16 | 0.6 | 0.47 | | A number of servers have been contacted by bxr3123 over the last month. Yesterday, data was moved to a server that was also contacted by bxr3123 | link |

FIG. 5A

| Time (510) | Entity (520) | Source (530) | Stage (540) | Behavior (550) | Indicator (560) | Link Path (570) | Risk (580) |
|---|---|---|---|---|---|---|---|
| 12/11/2015 | bxr3123 | Sharepoint | 3 | Server acting as client | IT records indicate server communicated with 5 other servers (expected is 0) | | 0.3 |
| 1/26/2016 | kng3913 | Sharepoint | 4 | Data gathering | Transferred 2 TB of data from Sharepoint (expected is 50 MB) | bxr3123--> kng3913 | 0.47 |
| 12/27/2015 | 10.2.87.34 | DNS | 3 | Client doing reconaissance | Communicated with 300 internal hosts (expected 3) | bxr3123--> bxr400 --> 10.2.87.34 | 0.2 |
| 12/15/2015 | jyu4016 | Proxy | 3 | Client doing reconaissance | Communicated with 20 internal hosts (expected is 3) | bxr3123 --> bxr400 --> jyu4016 | 0.1 |

SYSTEM AND METHOD FOR DETERMINING NETWORK SECURITY THREATS

BACKGROUND

This specification relates to detecting security threats.

Cyber threats to governments, retailers, and financial institutions are quite prevalent in today's Internet-based society. These threats have the ability to inflict catastrophic damage on network infrastructure and exploit sensitive data. Cyber threats can come from both inside and outside a network with insider threats usually proving to be the most damaging because inside actors have key network knowledge. Even though cybersecurity and network protection are critical issues, as employee fraud and insider malicious acts increase in sophistication, threats to networks continue to evade detection and create security problems for governments and companies.

SUMMARY

This specification describes technologies relating to cybersecurity in general, and specifically to methods and systems for detecting and prioritizing network threats.

In general, one aspect of the subject matter described in this specification can be embodied in a system comprising one or more computers and one or more storage devices storing instructions that are operable, when executed by the one or more computers to cause the one or more computers to perform operations that implement an example method. An example method comprises: obtaining, for each of a plurality of entities operating in a network being monitored for network security, a respective observed metric value for each of a plurality of metrics that characterize actions performed by the entity; for each of the plurality of entities and for each of the plurality of metrics: determining, using a machine learning model that is specific to the metric, an anomaly score for the observed metric value that represents how anomalous the observed metric value is relative to an expected metric value for the metric; determining, for each entity and from the anomaly scores for each observed metric value, a respective threat score for each entity; generating a security threat presentation that identifies one or more highest-scoring entities according to the threat scores; and providing the security threat presentation for display on a user device.

These and other embodiments can optionally include one or more of the following features. Determining, using a machine learning model that is specific to the metric, an anomaly score for the metric, can comprise: determining, for each observed metric value, the probability of the observed metric value occurring in the network being monitored using the machine learning model that is specific to the metric; and determining an anomaly score for each observed metric value from the determined probability of the observed metric value occurring in the network being monitored. The observed metric values can be ranked from most anomalous to least anomalous using the anomaly scores for the observed metric values. Determining, for each entity and from the anomaly scores for each observed metric value, a respective threat score for each entity may further comprise: for each of the plurality of entities: determining anomalous metric values associated directly with the entity; determining anomalous metric values associated indirectly with the entity; organizing the direct and indirect anomalous metric values into threat stages; aggregating anomalous metric values per threat stage; aggregating the anomalous metric values across threat stages; and providing the aggregation of the anomalous metric values from all threat stages of the entity as the threat score for the entity. Determining anomalous metric values associated indirectly with the entity may further comprise: determining anomalous metric values associated with one or more entities that are linked with the entity through a link path. Observed metric values may be organized into behaviors with which the observed metric values are associated and the behaviors may be organized into threat stages with which the behaviors are associated. A security threat presentation that identifies one or more highest-scoring entities according to the threat scores includes for each entity, a threat score for the entity, a time range for when the threat score is valid, a threat score at each threat stage, a case story that summarizes the threat score, and a link to details regarding the threat score. A security threat presentation that identifies one or more highest-scoring entities according to the threat scores includes for each entity: a threat score for the entity, a case story that summarizes the threat score, and details regarding the threat score. Details regarding the threat score further comprises: information about why the entity is a threat including at least one observed anomalous metric value of the entity or at least one anomalous metric value of a second entity linked to the entity through a direct or an indirect link path. Information about why the entity is a threat further includes: a date when the anomalous metric value was observed; an acting entity with which the anomalous metric value is associated; a behavior with which the anomalous metric value is associated; a stage with which the behavior is associated; an indicator explaining the anomalous metric value; a link path, linking the acting entity to the entity; and an anomaly score.

Particular embodiments of the subject matter described in this specification can be implemented so as to realize one or more of the following advantages. Conventional cybersecurity solutions fail to link threats or determine threat cases so that organizations can have a complete picture of the security threats within their networks. Conventional solutions also do not use machine learning models to model entity metric behavior in order to differentiate normal behavior from abnormal behavior. Therefore, the inventive system is advantageous over conventional cybersecurity solutions in determining and predicting network threats.

The details of one or more embodiments of the invention are set forth in the accompanying drawings which are given by way of illustration only, and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

An example cyberattack can occur in several stages such as planning, initial access/command and control, mapping and reconnaissance, lateral movement, staging, and exfiltration. In an example implementation, cyberattack stages are labeled 1-5. Each stage is defined by important behaviors that represent potential threats in a network which include network mapping, command and control, beaconing, contacting suspicious URLs, staging, client server violations, exfiltration via proxy, a sever acting as a client, data gathering, and a client doing reconnaissance. As the stage number increases so does the severity of network threats.

Stage 1 is defined by planning activities. During planning, malicious actors usually collect data from open source, social media, stock market, business functions, or threat modeling exercises. Stage 2 is defined by gaining initial access and command and control of a network. In this stage, malicious actors may try to have repeat or periodic communication with targeted systems. Malicious actors may try to acquire targeted network data in a variety of ways including using proxies, domain name services, secure shell protocol (SSH), and file transfer protocol (FTP). Malicious actors may also try to spoof networks or control malicious domains that are close in name to a targeted domain. For example, malicious actors may control the domain "goo.le.com" which would be a close mistype of Google's actual domain of "google.com." Data acquired at this stage may be from outside a targeted network, but may include network data.

Although an example system may recognize behaviors at the planning and initial access stages, the example system is most concerned with behaviors in later stages of an attack, stages 3-5, since the majority of the activities at these later stages are internal to a network and directly threaten the network's assets and entities.

Stage 3 is defined by "mapping and reconnaissance/lateral movement" behaviors from which a network may be mapped and explored. Techniques may include exploring the network by directory traversal, file access using FTP broad and deep searches, use of FTP directory commands, and internal network scans. Behaviors associated with this stage may include: a server acting as a client, a client doing reconnaissance, network mapping, client server violation, beaconing, suspicious URL access, and command and control behaviors.

In stage 4, defined as "staging," data may be positioned for easy access. Staging techniques may include database accesses, file saving by type or encryption, and moving data to a particular location within the network. Behaviors associated with this stage may include: client/server violations, movement of data to a particular location, and accessing a database a number of times.

Stage 5 is called "exfiltration" and it is defined by sending data off of a network. Behavior associated with this stage may include: access of suspicious URLs, exfiltration via proxy, requests unique in pathways, type, length, and/or encoding.

Stage behaviors can be further be defined by granular metrics and measured from events occurring in a network.

Figure 1:
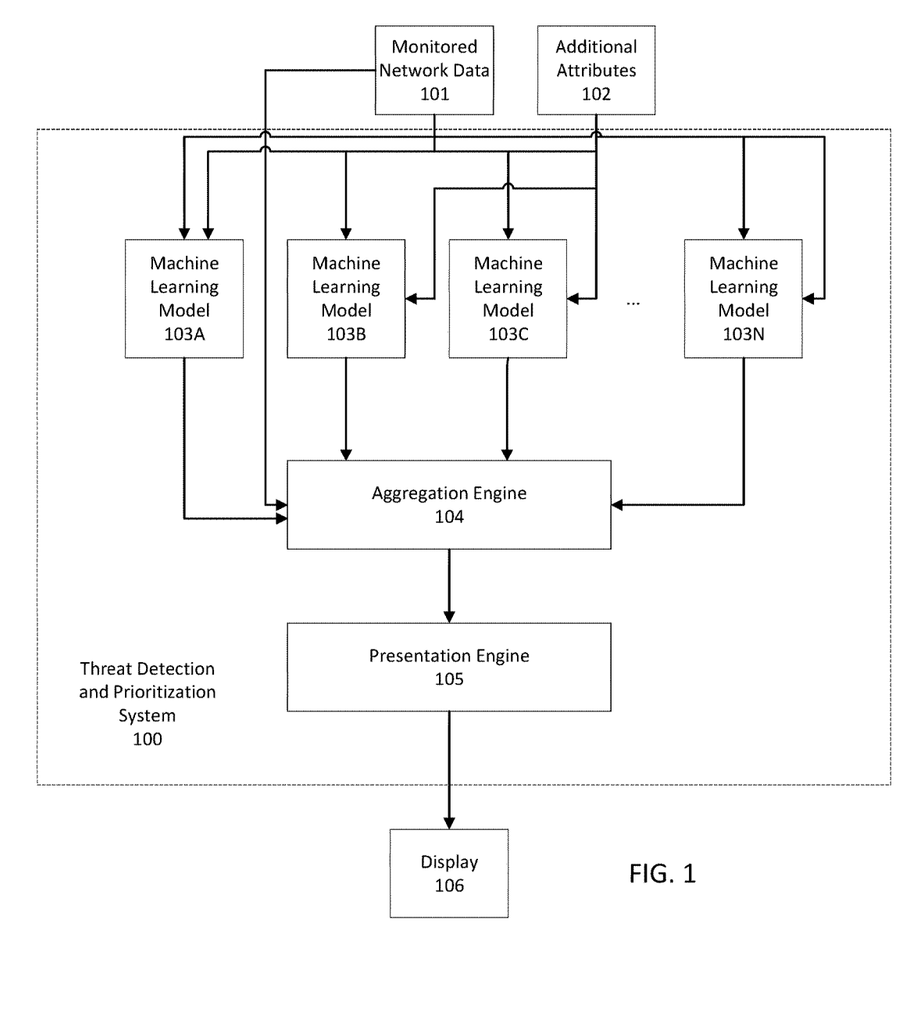
FIG. 1 illustrates an example system for determining and prioritizing network threats.

FIG. 1 illustrates an example threat detection and prioritization system (100). The threat detection and prioritization system 100 is an example of a system implemented as computer programs on one or more computers in one or more locations, in which the systems, components, and techniques described below can be implemented.

In order to detect network security threats, anomalous behavior in a network must be easily recognized. Specific expected network behavior should therefore be well-defined to differentiate anomalous behavior from expected behavior.

The example system 100 contains machine learning models (103A-103N). Each model models an expected behavior metric of an entity, such as a user or host, in a specific monitored network. These models are configured using information about typical entity behavior in the monitored network from various sources.

Typical entity behavior can come from raw data that contains information regarding normal events occurring in a monitored network. These events describe entity activities within the monitored system. An event has specific defining features including: event type, event time, activity, the name of the entity that performed the event, a metric, and other pertinent information associated with the event.

For example, a server, bxr3123, communicates with another server, bxr400 in a monitored system. This communication can be logged as entity behavior with an activity of "communication with a server." The source of the communication is logged as server bxr3123; the recipient of the communication, bxr400; the time and/or date of the communication, and the duration of the communication.

As another example, server kng3913, transfers 2 TB of data from a Sharepoint server to itself. The data transfer may be logged as an activity of "data transfer" and includes the source of the data, Sharepoint; the destination of the data, kng3913; the entity responsible for the transfer, kng3913, the amount of data transferred, 2 TB; and/or the date/time of the transfer.

In operation, each machine learning model takes in a set of attributes that help the model predict the expected value of the specific metric value for which the model is defined. These attributes may include context features, raw data measures, and conditions. Information about normal entity behavior in a monitored network can also come from sources such as proxy servers, databases, entitlements, authentication servers, file transfers and flows, domain name services, and dynamic host configuration protocol services.

For example, if a machine learning model is modeling the data transfer metric of a user on a network, the machine learning model may take a job description for a user as an input attribute. If a user has a role as an administrator in the monitored network, the number of bytes the user sends off the monitored network could be learned to be more than a non-administrator. Therefore, the user's role is important in helping define expected entity metrics for the user.

Attributes may include information about past metrics. A machine learning model that models an exfiltration metric may also take as input the number of bytes of data the user has sent off the monitored network each day for the last seven days. Entity characteristics including role, functionality, and historical behavior may be critical information for determining expected metrics of a given entity in a monitored system.

Additionally or alternatively, machine learning models in the threat detection and prioritization system can be used to detect anomalous behavior. Since each machine learning model is configured for a specific entity behavior metric, each machine learning model (103A-103N) may take as input an observed metric value from the monitored network data (101) for a given entity that is related to the specific metric for which the model was configured and the attributes relevant to the specific metric. An observed metric value for an entity is the value for the specific metric that the monitored network has observed for the entity.

As new data of event metrics comes into the monitored network, the event metric values are compared with expected monitored entity metric values generated by the models.

For example, in the example system, the observed data transfer metric described above of 2 TB from server kng3913 will be input into the machine learning model responsible for evaluating expected data transfer metrics. If the model expects that the maximum amount of transferred data on a given day by the server kng3913 is 50 MB, the 2 TB data transfer may be scored as anomalous behavior.

Another machine learning model may help recognize when a client is conducting reconnaissance on a network by modeling the number of internal hosts with which a given entity communicates. This model may determine that an entity is expected to communicate with 3 internal hosts in a given month. However, if the example system observes that an entity, 10.2.87.34, has communicated with 300 internal hosts, the example system will score this communication as anomalous. The example system may observe that a second entity, jyu4016, has communicated with 20 internal hosts and determine that the communication behavior of jyu4016 is also anomalous.

Models determine expected metrics for the monitored network based on observations of behavioral and contextual dimensions. In some implementations, models may include distance-based models that make determinations based on normalized Euclidean distance, mahalanobis distance, k-nearest neighbors, or entity graph attributes. In other implementations, models may be prediction-based and use approaches such as logistic regression, linear regression, or naive conditional likelihood. Models may make segmentation improvements by using sub scores that have been previously computed for other stages. For example, one input into a model of a Stage 5 exfiltration behavior on a Tuesday could be the predicted Stage 4 Collection score from the previous Monday or an average collection score over the past week.

Each machine learning model can output either a single value of an expected metric value per entity or an anomaly score per entity for the specific metric associated with the model. The expected metric value for a specific metric for an entity indicates the value that the example system expects the entity to have for the specific metric. If a model outputs the expected metric value, an example system can determine an anomaly score for the metric per entity based on the difference between the expected value and an observed value of the metric for the entity.

The anomaly score indicates how anomalous an observed metric value is relative to an expected metric value for the specific metric. An example model can output an anomaly score if it receives an observed metric as input. Example models may be logistic or linear regression models that can determine a range of values for a metric and the probability of each value in the range. Each model may not only recognize that an observed metric value is different from an expected metric value, but the model predicts how likely the actual, observed metric value is to occur in the monitored network.

To determine the likelihood of the observed metric value, an example model may compute how likely the observed metric is to occur, given the model. The example system generates a probability for the observed value using a trained machine learning model. In the above example, a machine learning model determines that an entity is expected to communicate with 3 internal hosts in a given month and two entities have communicated with more hosts than expected. The machine learning model can determine which of the two entities poses the higher threat based on the probability of the observed metric, given the learned model Since server 10.2.87.34 has communicated with 300 internal hosts which is less likely than server jyu4016's 20 internal hosts, server 10.2.87.34 poses a greater threat to the monitored system than server jyu4016 in terms of communication with internal hosts.

An aggregation engine (104) aggregates anomaly scores. The aggregation engine can aggregate all metrics associated with an entity to determine a threat score of the entity. The aggregation engine can additionally or alternatively aggregate anomaly scores from all entity behavior metrics associated with a particular stage to determine a threat score of the stage. Specifics regarding aggregation will be discussed in more detail below with respect to FIGS. 2, 5A, 5B, and 6.

A presentation engine (105) generates a security threat presentation that identifies one or more highest-threat scoring entities based on the threat scores of entities. The presentation engine (105) can also provide details about the security threat of each of the highest-threat scoring entities. The presentation engine (105) can then send the generated security threat presentation for display on a display device (106). More information about the security threat presentation is provided below with respect to FIGS. 5A, 5B, and 6.

Figure 2:
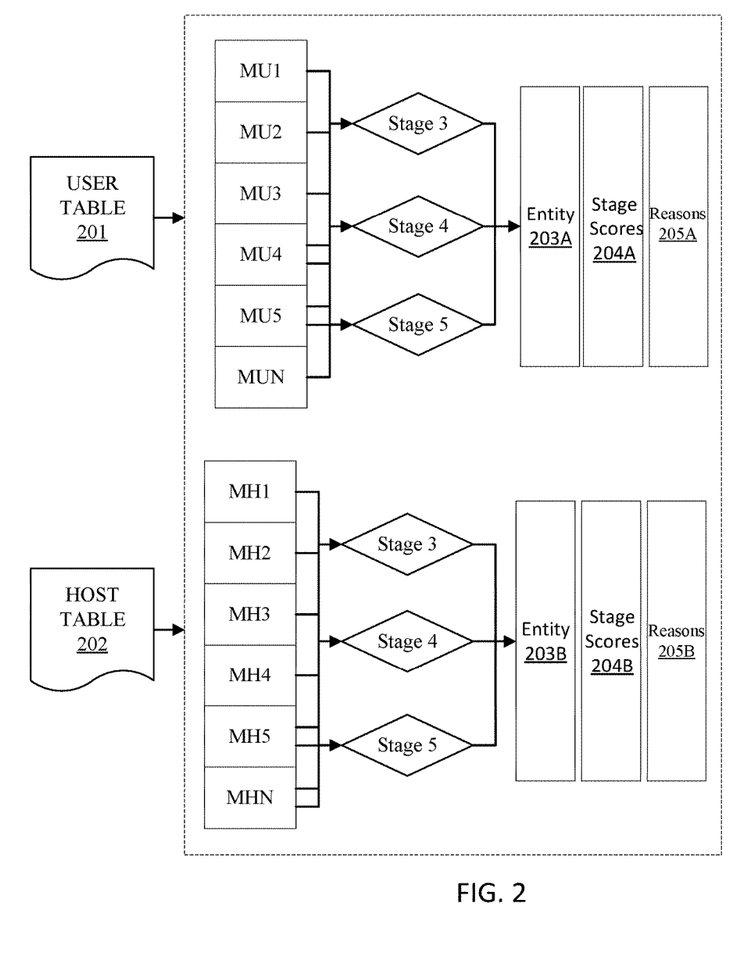
FIG. 2 illustrates an example system with machine learning models to determine, prioritize, and link network threats.

FIG. 2 illustrates an example system with machine learning models to determine, prioritize, and link network threats.

As illustrated in FIG. 2 and described above, machine learning models (MU1-MUN, MH1-MHN) are each configured to model a specific entity metric. Each machine learning model takes a set of attributes and optionally an observed metric value and outputs an expected metric or an anomaly score. In the example system, different machine learning models are configured for users (MU1-MUN) and for hosts (MH1-MHN). The specific metric for each machine learning model may be identified by subject matter experts of the monitored system.

As described above, observed entity behaviors are input into the machine learning models and expected metric values or anomaly scores are obtained from the models.

An example system then ranks metric values by their anomaly score from most anomalous to least anomalous. In the example above, server 10.2.87.34 that communicated with 300 internal hosts has an anomaly score of 0.2. Server jyu4016 that communicated with 20 internal hosts has an anomaly, score of 0.1. As expected, the metric analysis shows that server jyu4016 is less risky, and less anomalous, than server 10.2.87.34 so server 10.2.87.34 will be ranked higher than server jyu4016.

The modeled metrics are event metrics that are associated with threat behaviors that can be quantified and determined in the monitored network. For example, a potential threat behavior is network mapping, which is classified as a stage 3 behavior as described above. Network mapping is the process of discovering the devices on the network and how they are connected.

Network mapping behavior may be malicious when this mapping information is used in ways that can harm the network. To detect network mapping behavior, an example system monitors and measures metrics associated with the behavior from entities in the monitored system. As an example, one metric associated with beaconing is the count of distinct Domain Name Service (DNS) requests an entity has made. Another metric is the count of the new DNS names in the entity's domain list in the last seven days. A third metric is the count of the unique DNS names in the entity's domain list in the last seven days. Each of these metrics may be modeled by a separate machine learning model (MU1-MUN, MH1-MHN).

Network mapping is merely an example behavior. Other potential harmful behaviors that can be defined by metrics and modeled by machine learning models include: beaconing, data gathering, client doing reconnaissance, staging, and exfiltration. Each of these behaviors may be defined by an event metric or a set of event metrics that are modeled by machine learning models.

In addition to ranking metrics, an example system organizes metrics observed in the monitored network by threat stages to which the behaviors associated with the metrics belong and across time and days as shown in FIG. 2. example, as described above, metrics associated with network mapping and reconnaissance are classified as stage 3 metrics. Not only can metrics be collected over days, but metrics may be collected over long time periods such as weeks or months.

An example system provides an anomaly score per entity for each stage (203A, 203B), overall stage scores (204A, 204B) based on the aggregate anomaly scores at each stage, and provides the reasons for the anomaly scores (205A, 205B).

Figure 3:
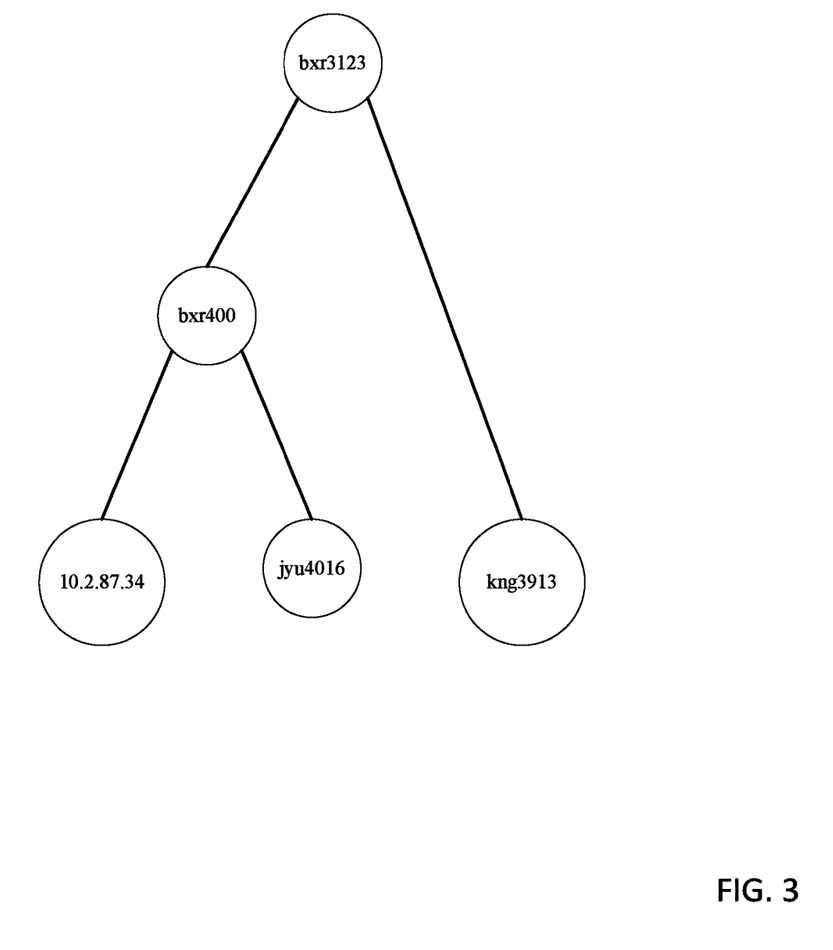
FIG. 3 illustrates links among entities in a monitored system.

FIG. 3 illustrates links among entities in a monitored system. The example system can determine the entire threat risk that an entity poses to a monitored system using anomaly scores and linked entities. For example, an example system can determine the threat posed by bxr3123. The example system may determine that server bxr3123 contacted numerous servers over the last month using events from the monitored network. The example system may then determine threatening behavior of server bxr3123. In order to determine the overall risk posed by server bxr3123, the example system determines the anomaly score of all entities linked to the server, either directly or indirectly. In this example, as illustrated in FIG. 3, bxr3123 is linked to server kng3913 directly. Bxr3123 is also linked indirectly to servers 10.2.87.34 and jyu4016 through direct links to server bxr400.

The example system generates a final threat score for each entity by incorporating the threats associated with linked entities. A link is established by an entity initiating a connection to another entity. For example, host A contacting host B will put host B in host A's linked entity list. The example system then generates a threat presentation to describe network threats to inform an end user. As described above, server kng3913 performed an anomalous data transfer and servers 10.2.87.34 and jyu4016 performed anomalous behavior by communicating with anomalous numbers of internal hosts. These behaviors of linked entities factor into the final threat score assigned to server bxr3123.

Figure 4:
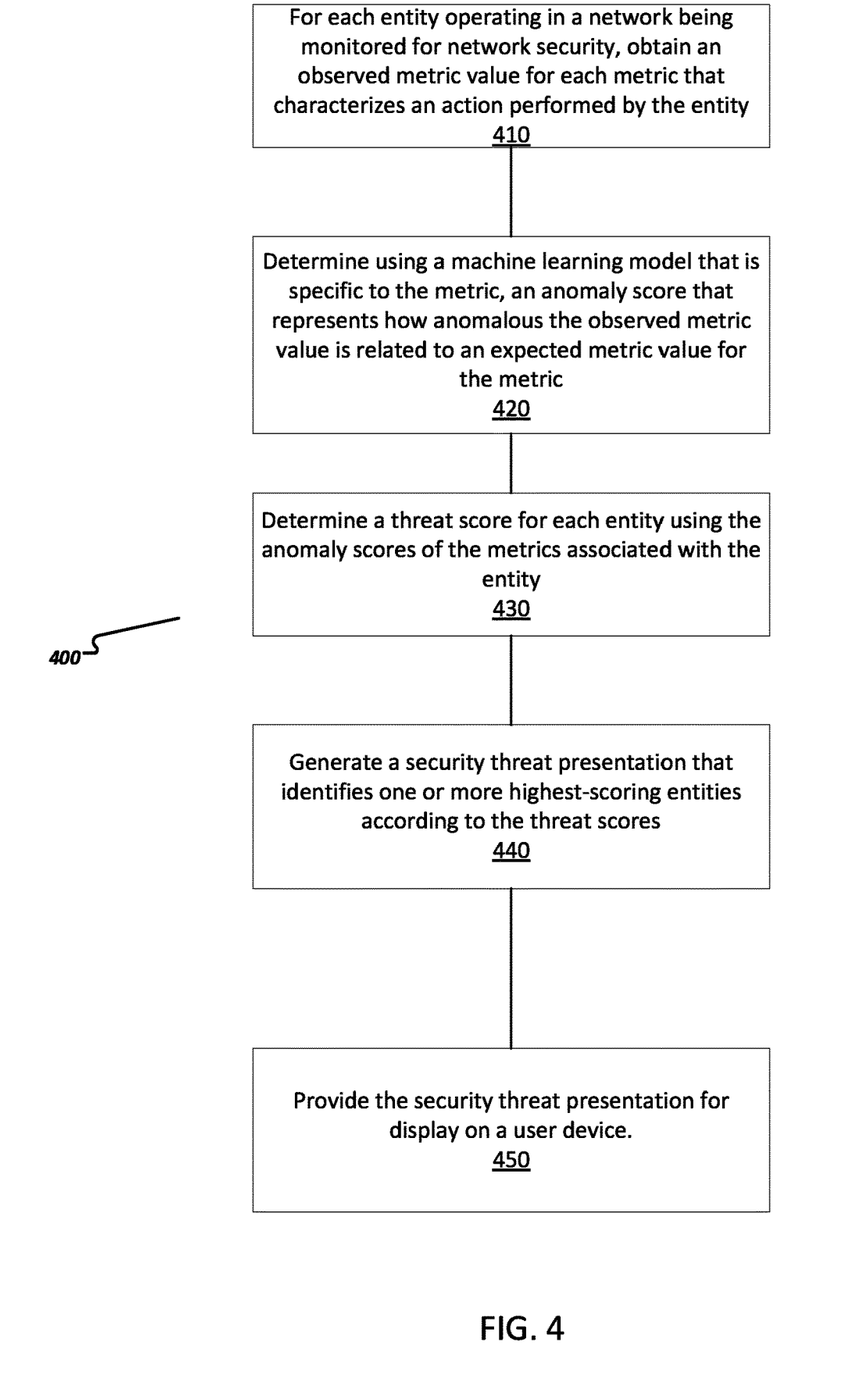
FIG. 4 is a flowchart of an example process for determining network security threats.

FIG. 4 is a flowchart of an example process 400 for determining network security threats. For convenience, the process 400 will be described as being performed by a system of one or more computers, located in one or more locations, and programmed appropriately in accordance with this specification. For example, an example threat detection and prioritization system (100) of FIG. 1, appropriately programmed, can perform the process 400. For each entity operating in a network being monitored for network security, an example system obtains an observed metric value for each metric that characterizes an action performed by the entity (410). The example system then inputs attributes and optionally inputs an observed metric value into a machine learning model that is specific to the metric. Machine learning models in the example system can be configured to obtain anomaly scores that represent how anomalous an observed metric value is in relation to an expected metric value for the metric (420). The example system aggregates the anomaly scores of the metrics associated with each entity to determine a threat score for each entity (430). Aggregation can be performed by a trained machine learning model that receives the anomaly scores and outputs an aggregated anomaly score. Aggregated metrics can also be used to determine a threat score for each stage. Cross-stage aggregation can be performed by a trained machine learning model that receives metrics from across stages and outputs an aggregated cross-stage value. Alternatively or additionally, cross-stage aggregation can be performed by a summation across stages. An example system can then generate a security threat presentation that identifies one or more highest-scoring entities according to the threat scores (440) and provides the security threat presentation for display on a user device (450).

Figure 5A:
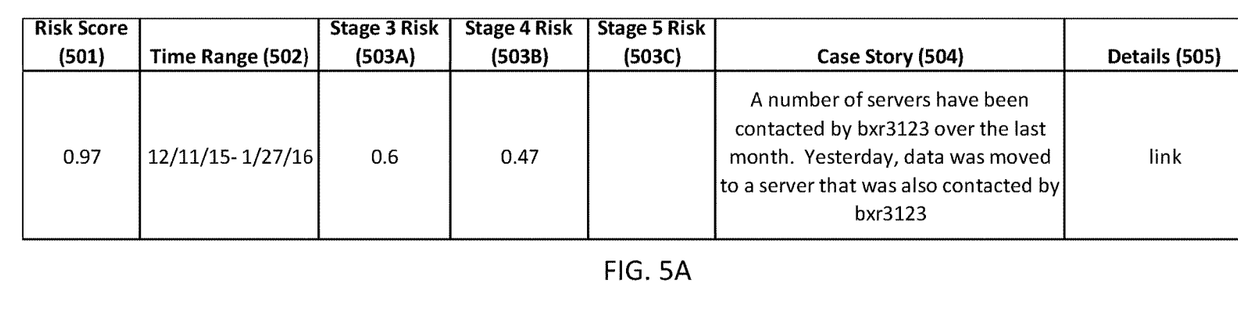
FIG. 5A shows an example of a display for a total risk, or anomaly, score for an entity.

FIG. 5A shows an example of a display for a total risk, or anomaly, score for an entity. As shown in FIG. 5A, a risk (or anomaly) score (501), a time range (502), and a case story summarizing the risk an entity presents to the network is displayed (504). The risk scores at each stage may also be presented (503A-C). The total risk score (501) may be a summation of the anomalous scores of the entity at each stage (503A-503C). The display may also include details (505), linking a user to more information about the risk that the entity poses to the monitored network.

Figure 5B:
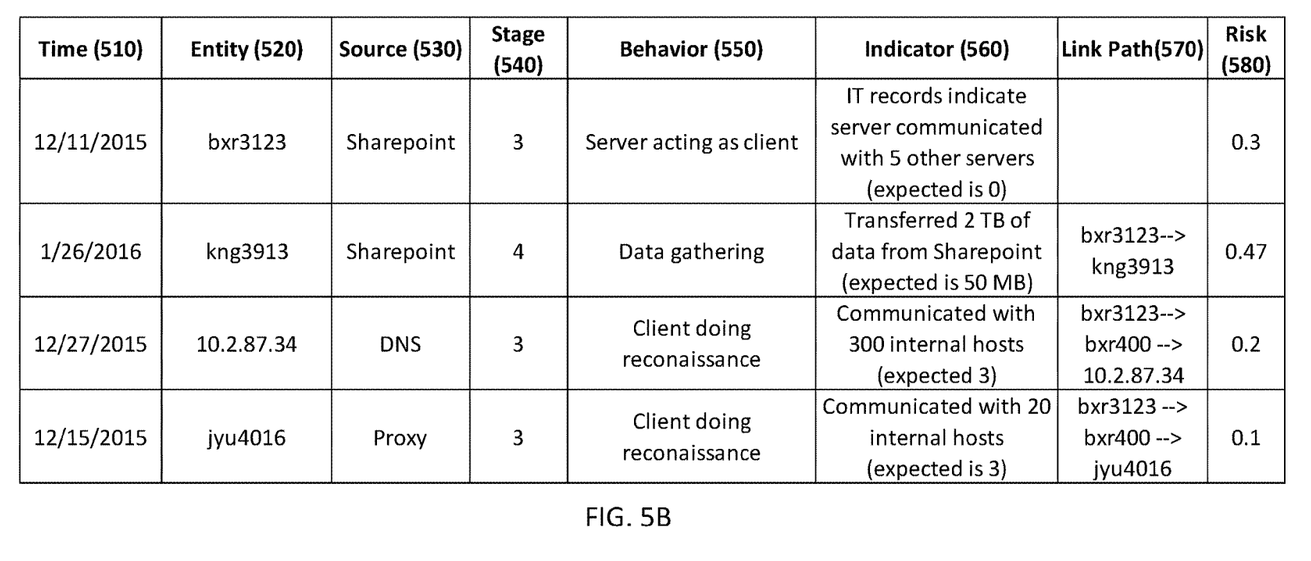
FIG. 5B shows an example of a display for detailed information about the entity behavior that contributed to the final threat score for the entity.

FIG. 5B shows an example of a display for detailed information about the entity behavior that contributed to the final threat score for the entity. This detailed information includes a time (510), an entity directly associated with the anomalous metric value (520), a source from which information was provided (530), the threat stage associated with the anomalous metric value (540), a behavior with which the anomalous metric value is associated (550), a threat indicator indicating the reason why the anomalous metric value is a risk (560), a link path linking the entity directly associated with the anomalous metric value to the original entity for which these details are displaying (570), and a risk score for each anomalous metric value (580).

For example, as described above, an example system may determine that server bxr3123 poses a threat to the monitored network because the server has contacted numerous other servers over the last month. The example system may provide additional information about the extent of the server threats. The example system can provide a threat story for the server as shown in FIGS. 5A and 5B that describe anomalous behavior associated with the entity and explain the threat risk of the entity to the monitored network. This threat story may be available for display to a user concerned with the security of the monitored system.

In the example, as described above, server bx3123 directly communicated with servers bxr400 and server kng3913. Server bxr400 directly communicated with servers 10.2.87.34 and jyu4016. Server 10.287.34 has an anomaly score of 0.2 for communicating with 300 internal hosts and server jyu4016 has an anomaly score of 0.1 for communicating with 20 internal hosts. This communication with internal hosts is classified as a stage 3 behavior of "client doing reconnaissance."

As shown in FIG. 5B, server bxr3123 also communicated with 5 other servers when a machine learning model modeling communication with servers expected communication with 0 other servers. This anomalous behavior has an anomaly score of 0.3 and is associated with a stage 3 behavior of "server acting as client."

In this example, as illustrated in FIG. 5B, server bxr3123 has communicated with server kng3913. As described above, server kng3913 transferred 2 TB of data from a data server when the expected value was 50 MB. This anomalous behavior produces an anomaly score of 0.47 and is associated with stage 4, staging data.

In order to determine the total stage score for an entity, the anomaly scores associated with the entity at each stage needs to be aggregated. In this example, server bxr3123 has three associated behaviors with anomaly scores in stage 3 that need to be combined to determine the stage 3 score of bxr3123. By combining the risk, or anomaly, scores, the stage 3 risk for server bxr3123 can be determined to be 0.6. To determine the entire threat for server bxr3123, the stage 4 and 5 anomaly scores must also be determined.

In this example, the anomaly score for bxr3123 at stage 4 is 0.47. There are no observed stage 5 anomalous behaviors. Therefore, bxr3123 has not currently detected risks at stage 5.

A threat story explains the threat risk that a given entity poses to a monitored network based on stage risk behaviors and scores, the behavior the entity has participated in or with which the entity is associated, and the time range of the anomalous behavior.

As illustrated in FIG. 5A, an example system determines a total risk, or anomaly, score for an entity by summing the risk scores at different stages or using a learned combination model. In this example, bxr3123 has a risk score of 0.6 at stage 3, 0.47 at stage 4, and 0 at stage 5. Therefore, bxr3123's total risk, or anomaly, score is 0.97. A time frame (502) may be associated with the risk, or anomaly, score based on the time frame of the observed behavior.

For example, the observed behavior may be observed from Dec. 11, 2015 to Jan. 27, 2016. A case story (504) summarizing the risk and the reasons for the risk, or anomaly, score of an entity may be provided in order to give context. For example, a case story associated with bxr3123 may include information about how the server has contacted multiple servers over the last month and that data was moved to a server that was also (indirectly) contacted by bxr3123.

Although network behavior may look harmless in isolation, aggregated entity metrics and behavior may raise concerns. Threat cases may link evidence into coherent stories that explain potential threats and speed network security investigations. Context and threat linking may enhance analysis by connecting pieces of evidence together so that potential network threats are clear.

Figure 6:
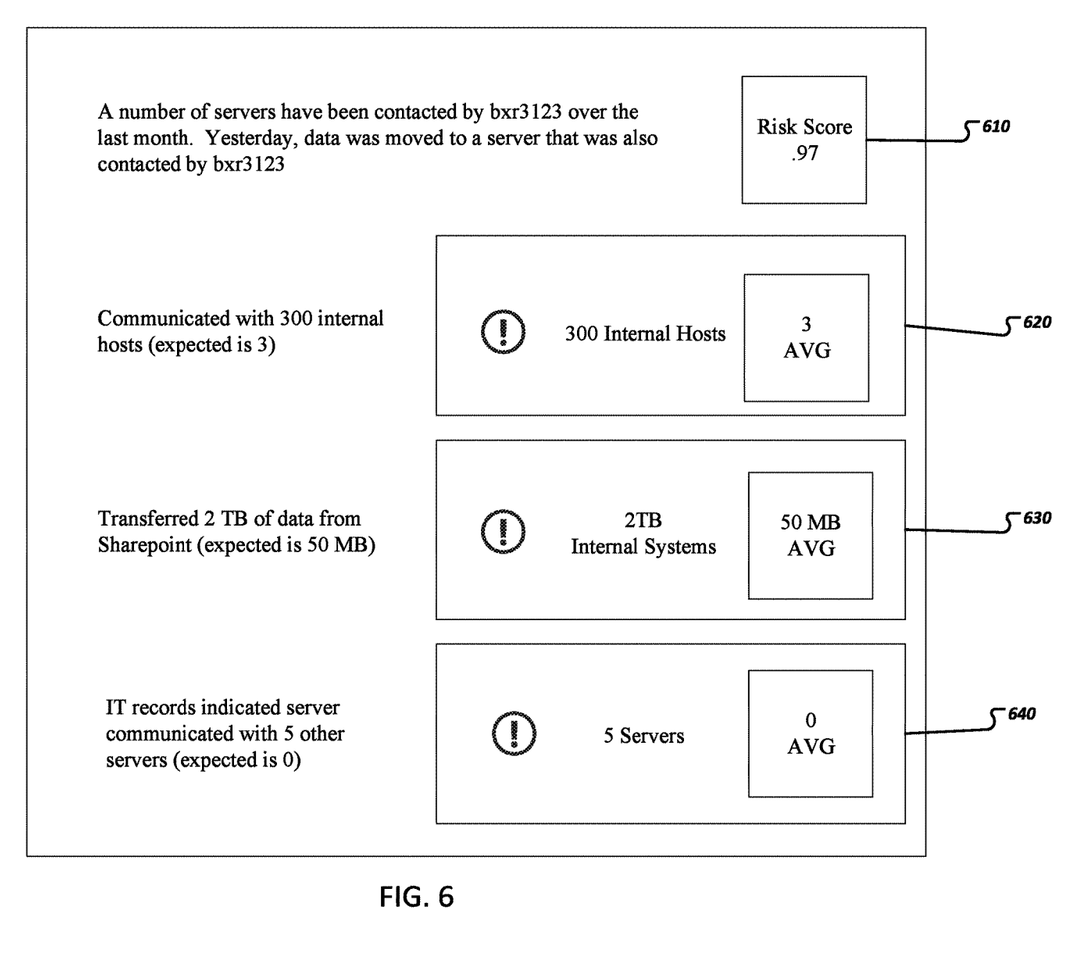
FIG. 6 shows another example of displaying threat information on a user device.

FIG. 6 shows another example of displaying threat information on a user device. Anomalous metric value information for an entity may presented on a single screen with the total anomaly, or risk, score (610) being displayed along with the anomalous metric values that contributed to the anomaly score (620-640). A quick summary of information regarding the anomalous behavior by the entity or entities linked to the suspect entity may also be presented in the display.

While this specification describes detecting network threats, the techniques described can also be applied in other contexts. For example, anomalous behavior may be collected and analyzed for detecting other issues such as money laundering, insurance fraud, insider trading, or other behavior detrimental to companies and businesses based on metrics that are specific to the particular domain.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a computer-implemented method for determining network threats, the method comprising:
 obtaining, for each of a plurality of entities operating in a network being monitored for network security, a respective observed metric value for each of a plurality of metrics that characterize actions performed by the entity;
 for each of the plurality of entities and for each of the plurality of metrics:
 determining, using a machine learning model that is specific to the metric, an anomaly score for the observed metric value that represents how anomalous the observed metric value is relative to an expected metric value for the metric;
 determining, for each entity and from the anomaly scores for each observed metric value, a respective threat score for each entity;
 generating a security threat presentation that identifies one or more highest-scoring entities according to the threat scores; and
 providing the security threat presentation for display on a user device.

Embodiment 2 is the computer-implemented method of embodiment 1, wherein determining, using a machine learning model that is specific to the metric, an anomaly score for the metric, comprises:
 determining, for each observed metric value, the probability of the observed metric value occurring in the network being monitored using the machine learning model that is specific to the metric; and
 determining an anomaly score for each observed metric value from the determined probability of the observed metric value occurring in the network being monitored.

Embodiment 3 is the computer-implemented method of any embodiment 1-2, further comprising:
 ranking the observed metric values from most anomalous to least anomalous using the anomaly scores for the observed metric values.

Embodiment 4 is the computer-implemented method of any embodiment 1-3, wherein determining, for each entity and from the anomaly scores for each observed metric value, a respective threat score for each entity further comprises:
 for each of the plurality of entities:
 determining anomalous metric values associated directly with the entity;
 determining anomalous metric values associated indirectly with the entity;
 organizing the direct and indirect anomalous metric values into threat stages;
 aggregating anomalous metric values per threat stage;
 aggregating the anomalous metric values across threat stages; and
 providing the aggregation of the anomalous metric values for all threat stages of the entity as the threat score for the entity.

Embodiment 5 is the computer-implemented method of embodiment 4, wherein determining anomalous metric values associated indirectly with the entity further comprises:
 determining anomalous metric values associated with one or more entities that are linked with the entity through a link path.

Embodiment 6 is the computer-implemented method of any embodiment 1-5, further comprising:
 organizing observed metric values into behaviors with which the observed metric values are associated; and
 organizing the behaviors into threat stages with which the behaviors are associated.

Embodiment 7 is the computer-implemented method of any embodiment 1-6, wherein a security threat presentation that identifies one or more highest-scoring entities according to the threat scores includes for each entity, a threat score for the entity,
a time range for when the threat score is valid,
a threat score at each threat stage,
a case story that summarizes the threat score, and
a link to details regarding the threat score.

Embodiment 8 is the computer-implemented method of any embodiment 1-7, wherein a security threat presentation that identifies one or more highest-scoring entities according to the threat scores includes for each entity:
a threat score for the entity,
a case story that summarizes the threat score, and
details regarding the threat score.

Embodiment 9 is the computer-implemented method of any embodiment 7-8, wherein details regarding the threat score further comprises:
information about why the entity is a threat including at least one observed anomalous metric value of the entity or at least one anomalous metric value of a second entity linked to the entity through a direct or an indirect link path.

Embodiment 10 is the computer-implemented method of any embodiment 1-9, wherein information about why the entity is a threat further includes:
a date when the anomalous metric value was observed;
an acting entity with which the anomalous metric value is associated;
a behavior with which the anomalous metric value is associated;
a stage with which the behavior is associated;
an indicator explaining the anomalous metric value;
a link path, linking the acting entity to the entity; and
an anomaly score.

Embodiment 11 is a system of one or more computers and one or more storage devices storing instructions that are operable, when executed by the one or more computers to cause the one or more computers to perform the operations of any one of embodiments 1-10.

Embodiment 12 is one or more non-transitory computer readable-storage mediums comprising instructions stored thereon that are executable by a processing device and upon such execution cause the processing device to perform the operations of any one of embodiments 1-10.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for determining network threats for a computer network, the method comprising:
obtaining, for each of a plurality of entities operating in a computer network being monitored for network security, a respective observed metric value for each of a plurality of metrics that each represent a respective behavior exhibited by the entity, wherein the plurality of entities comprise at least one or more users or one or more host computers;
for each of the plurality of metrics,
training, using information about typical entity behavior in the monitored network from various sources, a respective machine learning model that is specific to the metric and that models an expected metric value for the metric;
for each of the plurality of entities and for each of the plurality of metrics:
determining, using the trained machine learning model that is specific to the metric and an anomaly score for the observed metric value for the entity that represents how anomalous the observed metric value is relative to an expected metric value for the metric by:
determining a probability of the observed metric value occurring in the computer network being monitored using the trained machine learning model that is specific to the metric; and
determining the anomaly score from the determined probability of the observed metric value occurring in the computer network being monitored, the anomaly score indicating how anomalous the observed metric value for the entity is relative to an expected metric value for the specific metric
aggregating the anomaly scores from the machine learning models specific to the respective metrics, to generate a respective threat score for each entity; and
determining detecting potential network threats based on the threat scores of the entities.

2. The computer-implemented method of claim 1, further comprising:
ranking the observed metric values from most anomalous to least anomalous using the anomaly scores for the observed metric values; and
providing the ranked observed metric values for display on a user device.

3. The computer-implemented method of claim 1, wherein aggregating the anomaly scores from the machine learning models specific to the respective metrics to generate a respective threat score for each entity further comprises:
for each of the plurality of entities:

determining anomalous metric values associated directly with the entity;
determining anomalous metric values associated indirectly with the entity;
organizing the direct and indirect anomalous metric values into threat stages;
aggregating anomalous metric values per threat stage;
aggregating the anomalous metric values across threat stages; and
providing the aggregation of the anomalous metric values for all threat stages of the entity as the threat score for the entity.

4. The computer-implemented method of claim 3, wherein determining anomalous metric values associated indirectly with the entity further comprises:
determining anomalous metric values associated with one or more entities that are linked with the entity through a link path.

5. The computer-implemented method of claim 1, further comprising:
organizing observed metric values into behaviors with which the observed metric values are associated; and
organizing the behaviors into threat stages with which the behaviors are associated.

6. The computer-implemented method of claim 1 further comprising:
generating a security threat presentation that identifies one or more highest-scoring entities according to the threat scores; and
providing the security threat presentation for display on a user device.

7. The computer-implemented method of claim 6, wherein a security threat presentation that identifies one or more highest-scoring entities according to the threat scores includes for each entity,
a threat score for the entity,
a time range for when the threat score is valid,
a threat score at each threat stage,
a case story that summarizes the threat score, and
a link to details regarding the threat score.

8. The computer-implemented method of claim 6, wherein the security threat presentation that identifies the one or more highest-scoring entities according to the threat scores includes for each entity:
a threat score for the entity,
a case story that summarizes the threat score, and
details regarding the threat score.

9. The computer-implemented method of claim 7, wherein the details regarding the threat score further comprises:
information about why the entity is a threat including at least one observed anomalous metric value of the entity or at least one anomalous metric value of a second entity linked to the entity through a direct or an indirect link path.

10. The computer-implemented method of claim 9, wherein information about why the entity is a threat further includes:
a date when the anomalous metric value was observed;
an acting entity with which the anomalous metric value is associated;
a behavior with which the anomalous metric value is associated;
a stage with which the behavior is associated;
an indicator explaining the anomalous metric value;
information about a link path, linking the acting entity to the entity; and
an anomaly score.

11. A system comprising:
one or more computers; and
one or more storage devices storing instructions that are operable, when executed by the one or more computers, to cause the one or more computers to perform operations comprising:
obtaining, for each of a plurality of entities operating in a computer network being monitored for network security, a respective observed metric value for each of a plurality of metrics that each represent a respective behavior exhibited by the entity, wherein the plurality of entities comprise one or more users or host computers;
for each of the plurality of metrics,
training using information about typical entity behavior in the monitored network from various sources, a respective machine learning model that is specific to the metric and that models an expected metric value for the metric;
for each of the plurality of entities and for each of the plurality of metrics:
determining, using the trained machine learning model that is specific to the metric and, an anomaly score for the observed metric value that represents how anomalous the observed metric value for the entity is relative to an expected metric value for the metric by:
determining a probability of the observed metric value occurring in the computer network being monitored using the trained machine learning model that is specific to the metric; and
determining the anomaly score from the determined probability of the observed metric value occurring in the computer network being monitored, the anomaly score indicating how anomalous the observed metric value is relative to an expected metric value for the specific metric,
aggregating the anomaly scores from the machine learning models specific to the respective metrics to generate a respective threat score for each entity; and
detecting potential network threats based on the threat scores of the entities.

12. The system of claim 11, wherein the operations further comprise:
ranking the observed metric values from most anomalous to least anomalous using the anomaly scores for the observed metric values; and
providing the ranked observed metric values for display on a user device.

13. The system of claim 11, wherein aggregating the anomaly scores from the machine learning models specific to the respective metrics to generate the respective threat score for each entity further comprises:
for each of the plurality of entities:
determining anomalous metric values associated directly with the entity;
determining anomalous metric values associated indirectly with the entity;
organizing anomalous metric values per threat stage;
aggregating anomalous metric values across threat stages; and
providing the aggregation of the anomalous metric values for all threat stages of the entity as the threat score for the entity.

14. The system of claim 13, wherein determining anomalous metric values associated indirectly with the entity further comprises:
  determining anomalous metric values associated with one or more entities that are linked with the entity through a link path.

15. The system of claim 11, wherein the operations further comprise:
  organizing observed metric values into behaviors with which the observed metric values are associated; and
  organizing the behaviors into threat stages with which the behaviors are associated.

16. The system of claim 11, wherein the operations further comprise:
  generating a security threat presentation that identifies one or more highest-scoring entities according to the threat scores; and
  providing the security threat presentation for display on a user device.

17. The system of claim 16, wherein a security threat presentation that identifies one or more highest-scoring entities according to the threat scores includes for each entity,
  a threat score for the entity,
  a time range for when the threat score is valid,
  a threat score at each threat stage,
  a case story that summarizes the threat score, and
  a link to details regarding the threat score.

18. The system of claim 16, wherein the security threat presentation that identifies the one or more highest-scoring entities according to the threat scores includes for each entity:
  a threat score for the entity,
  a case story that summarizes the threat score, and
  details regarding the threat score.

19. The system of claim 17, wherein the details regarding the threat score further comprises:
  information about why the entity is a threat including at least one observed anomalous metric value of the entity or at least one anomalous metric value of a second entity linked to the entity through a direct or an indirect link path.

20. One or more non-transitory computer-readable storage media having instructions stored thereon that, when executed by one or more processing devices, cause the processing devices to perform operations comprising:
  obtaining, for each of a plurality of entities operating in a computer network being monitored for network security, a respective observed metric value for each of a plurality of metrics that each represent a respective behavior exhibited by the entity, wherein the plurality of entities comprise one or more users or one or more host computers;
  for each of the plurality of metrics,
    training using information about typical entity behavior in the monitored network from various sources, a respective machine learning model that is specific to the metric and that models an expected metric value for the metric;
  for each of the plurality of entities and for each of the plurality of metrics:
    determining, using the trained machine learning model that is specific to the metric and, an anomaly score for the observed metric value for the entity that represents how anomalous the observed metric value is relative to an expected metric value for the metric by:
      determining a probability of the observed metric value occurring in the computer network being monitored using the trained machine learning model that is specific to the metric; and
      determining the anomaly score from the determined probability of the observed metric value occurring in the computer network being monitored, the anomaly score indicating how anomalous the observed metric value for the entity is relative to an expected metric value for the specific metric;
  aggregating the anomaly scores, from the machine learning models specific to the respective metrics to generate a respective threat score for each entity; and
  detecting potential network threats based on the threat scores of the entities.

21. The non-transitory computer-readable medium of claim 20, wherein the operations further comprise:
  generating a security threat presentation that identifies one or more highest-scoring entities according to the threat scores; and
  providing the security threat presentation for display on a user device.

* * * * *

UNITED STATES PATENT AND TRADEMARK OFFICE
CERTIFICATE OF CORRECTION

PATENT NO.      : 10,412,111 B2
APPLICATION NO. : 15/396273
DATED           : September 10, 2019
INVENTOR(S)     : Dustin Lundring Rigg Hillard et al.

It is certified that error appears in the above-identified patent and that said Letters Patent is hereby corrected as shown below:

In the Claims

Column 14, Line 36, in Claim 1, after "and" insert -- , --.

Column 14, Line 50, in Claim 1, after "metric" insert -- ; --.

Column 14, Line 52, in Claim 1, delete "metrics," and insert -- metrics --.

Column 14, Line 54, in Claim 1, before "detecting" delete "determining".

Signed and Sealed this
Fourteenth Day of January, 2020

Andrei Iancu
*Director of the United States Patent and Trademark Office*